US008352538B2

(12) United States Patent
Noonan et al.

(10) Patent No.: US 8,352,538 B2
(45) Date of Patent: Jan. 8, 2013

(54) TRANSACTION MONITORING SYSTEM

(75) Inventors: Julianne Noonan, Boyertown, PA (US); Maryann Feng, Exton, PA (US); Richard J. Gengler, West Chester, PA (US); Mannage Gunaratne, Phoenixville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1019 days.

(21) Appl. No.: 11/872,910

(22) Filed: Oct. 16, 2007

(65) Prior Publication Data
US 2008/0097901 A1 Apr. 24, 2008

Related U.S. Application Data

(60) Provisional application No. 60/829,560, filed on Oct. 16, 2006.

(51) Int. Cl.
G06F 15/16 (2006.01)

(52) U.S. Cl. .......................... 709/201; 709/224

(58) Field of Classification Search .................. 709/201, 709/224
See application file for complete search history.

(56) References Cited

U.S. PATENT DOCUMENTS

| | | | |
|---|---|---|---|
| 6,115,711 A * | 9/2000 | White | 1/1 |
| 6,330,589 B1 * | 12/2001 | Kennedy | 709/206 |
| 6,615,241 B1 * | 9/2003 | Miller et al. | 709/206 |
| 7,047,532 B1 * | 5/2006 | Connelly | 719/310 |
| 7,054,851 B2 | 5/2006 | Haley | |
| 7,219,094 B2 | 5/2007 | Schiel et al. | |
| 7,266,775 B2 | 9/2007 | Patitucci | |
| 7,275,081 B1 * | 9/2007 | Katz et al. | 709/203 |
| 7,720,912 B2 * | 5/2010 | Rooke et al. | 709/206 |
| 2003/0105389 A1 | 6/2003 | Noonan et al. | |
| 2005/0075964 A1 * | 4/2005 | Quinn et al. | 705/37 |
| 2005/0097566 A1 * | 5/2005 | Watts et al. | 719/313 |
| 2005/0288045 A1 * | 12/2005 | Yang et al. | 455/466 |
| 2006/0031348 A1 * | 2/2006 | Fox | 709/206 |
| 2006/0069700 A1 * | 3/2006 | Marston et al. | 707/104.1 |
| 2006/0085361 A1 * | 4/2006 | Hoerle et al. | 705/75 |
| 2006/0190493 A1 * | 8/2006 | Kawai et al. | 707/104.1 |
| 2006/0286968 A1 * | 12/2006 | Klassen et al. | 455/412.1 |
| 2007/0038759 A1 * | 2/2007 | Hanson et al. | 709/227 |
| 2007/0143425 A1 * | 6/2007 | Kieselbach et al. | 709/206 |
| 2007/0168464 A1 * | 7/2007 | Noonan et al. | 709/218 |
| 2007/0274291 A1 * | 11/2007 | Diomelli | 370/352 |
| 2007/0298770 A1 * | 12/2007 | Lee et al. | 455/412.2 |
| 2008/0055068 A1 * | 3/2008 | Van Wageningen et al. | 340/539.3 |
| 2008/0065653 A1 * | 3/2008 | Shneur et al. | 707/100 |
| 2008/0195579 A1 * | 8/2008 | Kennis et al. | 707/3 |
| 2009/0106323 A1 * | 4/2009 | Wong et al. | 707/201 |
| 2009/0248744 A1 * | 10/2009 | Masson et al. | 707/104.1 |
| 2010/0042698 A1 * | 2/2010 | Burns et al. | 709/206 |

OTHER PUBLICATIONS

David Walden, Jul. 17, 1973, "Lost Message Detection", Network Working Group Request for Comments, RFC 534, pp. 1-2.*

* cited by examiner

Primary Examiner — Firmin Backer
Assistant Examiner — Jonathan Bui
(74) Attorney, Agent, or Firm — Alexander J Burke

(57) ABSTRACT

A system for exchanging transaction messages between different computer systems includes a data processor for monitoring transaction messages. The data processor has a transaction processor for assigning identifiers to both inbound transaction messages from source executable applications and outbound transaction messages for communication to destination executable applications, to individually identify transaction messages. The data processor has a repository of map information associating inbound and outbound transaction messages using the assigned identifiers and a user interface for providing data representing at least one display image and including data identifying an inbound or outbound transaction message and a corresponding outbound or inbound transaction message, in response to a user command.

14 Claims, 5 Drawing Sheets

TRANSACTION MONITORING SYSTEM

This is a non-provisional application of provisional application Ser. No. 60/829,560, filed Oct. 16, 2006, by Julianne Noonan et al.

FIELD OF THE INVENTION

The present invention relates to transaction messages, and more particularly relates to a system for exchanging transaction messages between different computer systems, and monitoring the exchanged transaction messages.

BACKGROUND OF THE INVENTION

Computerized database systems are known and used as information repositories. Information is stored in information repositories and other databases for use with computer systems to store information necessary to operate the systems. Configuration data for controlling a new operational mode of a computer system, or executable application is entered into the database. User interface database systems are known that operate to retrieve the information and configuration data from such computerized databases or other information repositories, and facilitate exchanging data between the different computer systems and executable applications.

The OPENLink system by Siemens Medical Systems, Inc. is one known interface database system. The Siemens OPENLink interface database system is an executable application that facilitates exchange of data and monitoring among different computer systems. One computer system or executable application transmits data to the Siemens OPENLink system in a predetermined data format via a specific communications medium and protocol acceptable to the transmitting computer system. The Siemens OPENLink system in turn relays this data to a second computer systems. The second computer system receives the data in a predetermined data format via a specific communications medium and protocol acceptable by the receiving system. The data format, communications medium and protocol of the receiving computer system are not necessarily the same as those of the transmitting system. The OPENLink system acts as an interface, or integration engine to facilitate data and transaction message exchange between the computer systems, accommodating differences in data format, communications medium and protocol.

In the interface database system, the user configures endpoints of communication or connections between computer systems or executable applications and the interface, or integration engine, using configuration protocol. A connection as used in this context represents an object definition within the integration engine that is either responsible for inbound connectivity into the integrations engine from the source system or the outbound connectivity into the destinations system. A connection in this respect owns the responsibility for either sending or receiving data along with maintaining the archived transaction messages of that relationship.

A configured connection is associated to an interface controlled by the integration engine for communication, or message exchange between the integration engine and the computer system. A transaction message sent from a computer system to the integration engine is sent from an inbound connection. A transaction message sent to the computer system from the integration engine is sent to the connection. Connection is a term that describes the configured link to or from a computer system or executable application. Hence, connections are connections with the integration engine, or configured interfaces to an endpoint, or computer system. Sending a transaction message to a computer system, or receiving a transaction message by a computer system may be described with respect to the integration engine as sending to or receiving from an inbound or outbound connection. The communication interface, or integration enables communication data between particular source and destination computer systems (as respective inbound and outbound connections). The system receives transaction messages, or sends transaction messages by use of the configured connections. Such data communications and message exchanges are referred to as transactions. The exchange or transmission of transaction data is a transaction messages.

Known interface database systems typically do not permit the storing of both inbound and outbound data transaction messages and do not provide linking capability between the inbound and outbound transactions. Known system operation enables a user find a transaction in one transaction archive file, and then manually search for related transactions stored in other transaction archive files. It is difficult for a user to match an inbound transaction stored in one transaction archive file with a related outbound transaction stored in another transaction archive file. Currently this can be accomplished by concurrently viewing an inbound transaction archive file and an outbound transaction archive file, and attempting to match the posted times of the two transactions in the separate transaction archive files. It may be impossible to identify or correctly match linked transactions using conventional processes. For example, where the user interface system operates to control exchange of message transactions between different medical related computer systems it is difficult to match linked transactions, particularly where there are several archived transactions for the same patient that occurred around the same time.

Another problem with known interface system transaction processing relates to operation of user interface system functions that enable inbound transaction files to be edited, or the transaction message resent, which cause the system to create a new transaction. A user would want to know which transaction was used to create this new transaction. For this case, the original transaction is identified by looking through the transaction records in a transaction archive file to find one transaction record that has a reprocessed date/time that is the same time as the new transaction (in the new transaction record) that was created.

A system according to invention principles addresses these deficiencies and related problems.

SUMMARY OF THE INVENTION

A system for exchanging transaction messages between different computer systems includes a data processor for monitoring transaction messages. The data processor has a transaction processor for assigning transaction identifiers to both inbound transaction messages from source executable applications, or the different computer systems, and outbound transaction messages for communication to destination executable applications, or different computer systems, to individually identify transaction messages. An inbound and outbound connection comprise configured links enabling communication by the data processor with the different computer systems or executable applications. The data processor has a store of transaction data associated to a source connection and a destination connection. The data processor has a repository of map information associating inbound and outbound transaction messages using the assigned transaction identifiers and linkage information (linkage record), or connection name identifying the location of the associated transaction data store. The map information for a transaction message may be stored directly in the store for the connection with or in association with the stored transaction message. A user interface provides data representing at least one display image and including data identifying an inbound or outbound transaction message and a corresponding outbound or inbound transaction message, in response to a user command.

BRIEF DESCRIPTION OF THE DRAWING FIGURES

In order that the manner in which the above recited and other advantages of the invention may be obtained, a more particular description of the invention briefly described above is rendered by reference to specific embodiments thereof that are illustrated in the appended drawings. Understanding that these drawings depict typical embodiments of the invention and are not therefore to be considered to be limiting of its scope, the invention is described and explained with additional specificity and detail through use of the accompanying drawings in which.

DETAILED DESCRIPTION OF THE INVENTION

Figure 1:
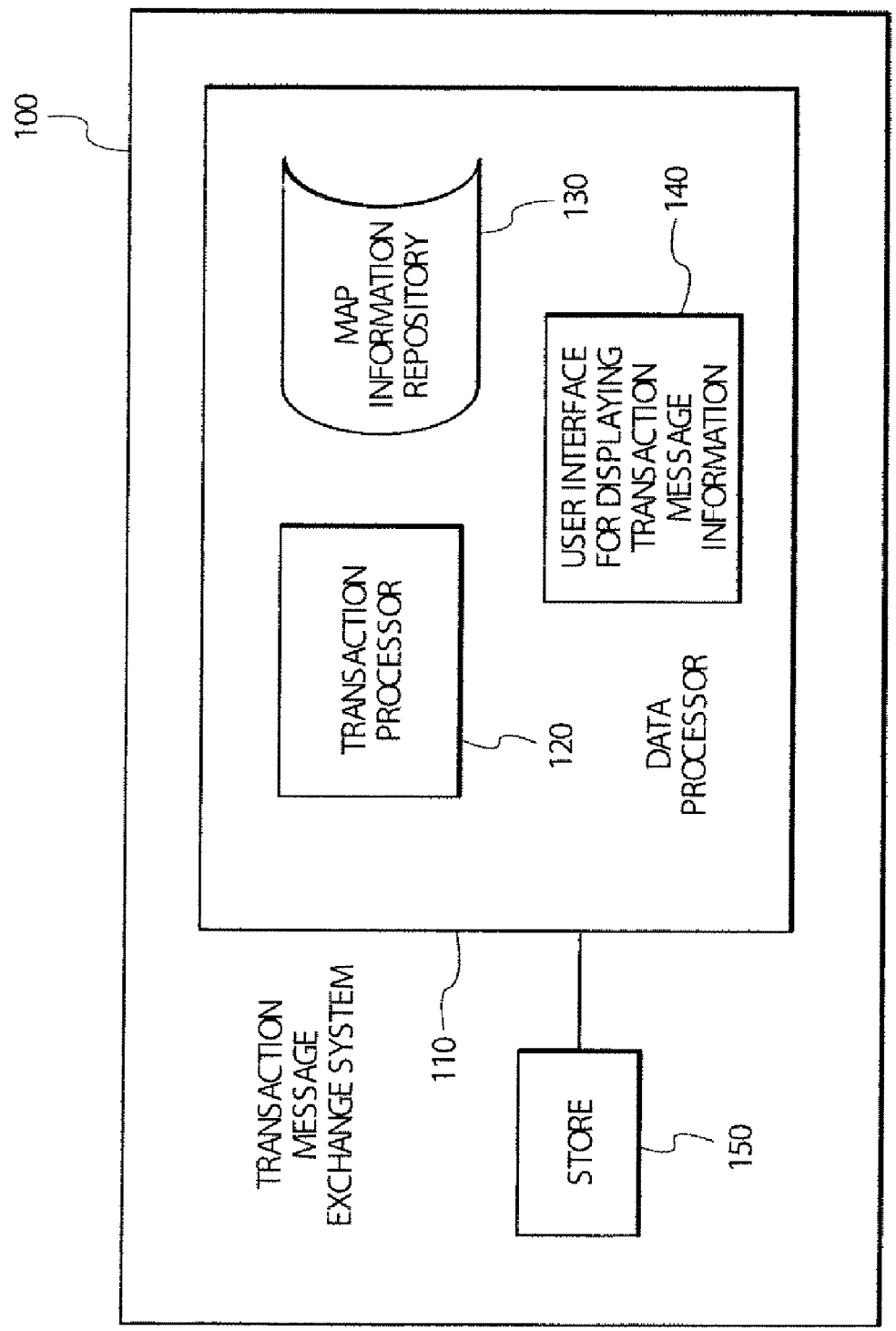
FIG. 1 is a schematic block diagram depicting a system for exchanging transaction messages between different computer systems or executable applications.

The inventive system exchanges transaction messages between different computer systems, or executable applications, and includes a data processor that monitors transaction messages. The data processor implements a transaction message exchange interface or transaction exchange integration engine that operates to manage transaction message exchange among the different computer systems. The data processor assigns an identifier to inbound and outbound transactions, to associate inbound and outbound transactions to configured connections for communication by the integration engine to a computer system, and from the computer system to the integration engine or data processor. A connection as used in this context represents an object definition within the integration engine that is either responsible for inbound connectivity into the integrations engine from the source system or the outbound connectivity into the destinations system. A connection in this respect owns the responsibility for either sending or receiving data along with maintaining the archived transaction messages of that relationship.

A repository of map information associates the inbound and outbound transaction messages to an inbound or outbound connection (representative of the source and destination computer systems) using the identifiers. A store stores transaction messages associated with a connection, for example, a store of inbound transaction messages associated with an inbound connection. Alternatively, the map information, or linkage indicator associating a transaction message to a connection may be stored with or in association with the stored transaction message. A user interface presents a display image to allow a user to select to view transactions linked to other transactions.

When a user is viewing a display image presenting one transaction, linkage or map information (linkage records), stored separately, or in a store with the transaction data, allows the user to link to and view transactions linked to the one transaction. If selected, the linkage information triggers presentation of a linked transaction list in one display image, including a transaction key for each linked transaction displayed. This combination of transaction keys and connection name (or connection identifier) to the stored, linked transactions enables a user to quickly retrieve and view the related transactions. This results in a savings of considerable user time in troubleshooting transaction threads associated with an executable application or data system, and results in better patient care where the interoperational computer systems are medical or healthcare related.

When a user accesses the system in order to resend a transaction message, or to reprocess a transaction message, for example, to account for missing or invalid data, the original message transaction is identified and accessed more quickly and more efficiently than with conventional transaction message interface systems. When operating to support healthcare operations, such capability for quick identification facilitates quicker and more efficient performance of associated hospital services. There is a cost savings, related to time saved, for matching a transaction with corresponding inbound or outbound transactions that are related to it. It is estimated that 10 minutes may be saved for each time a corresponding transaction needs to be located by use of the system. This number multiplied by a large number of transactions being investigated during normal workflow results in a substantial time savings, and improvement in efficiency, accuracy and cost reduction practices.

As used herein, a connection is an end point of a communication from a perspective of the message exchange integration engine. Connections represent object definitions within the integration engine that is either responsible for inbound connectivity into the integrations engine from the source system or the outbound connectivity into the destinations system. A connection within this respect owns the responsibility for either sending or receiving data along with maintaining the archived transaction messages of that relationship. So in a sense a connection identifies the connectivity to or from a computer system for transaction message with the integration engine. An endpoint of communication within the system is identified as a connection, and represents to the system the link to the communication endpoint with the computer system (or executable application).

A communication is conducted by transaction, including send and receive data transmissions by connection to and from computer systems or executable applications. Data transmission is executed by one connection (inbound) sending message data comprising the transaction to the message exchange integration engine. The transaction message is processed and the transaction is transmitted by another connection (outbound) to another computer system. An computer system may be a source of a transaction message, or a destination for a transaction message. When transaction message data is exchanged, the exchange executes via requests and responses via the connections. Each request or response relating to a transaction message is executed using a thread or threads within one process implemented by one of the computer systems or executable applications.

The system assigns a transaction identifier or key and linkage information for each transaction (message) that is processed. The identifier uniquely identifies the transaction within the store for the connection. The identifier is a part of the linkage information, or linkage record to facilitate mapping inbound to inbound, inbound to outbound and outbound to inbound transactions. The name or identity of each inbound and outbound connection identifies the storage location for the identifier. As mentioned, the linkage identifier and associated transaction may be stored separately, or stored together for system use. Inbound and outbound transaction records, or files are created to store transaction messages in association with an inbound and outbound connection. The stored inbound and outbound archive files comprise a copy of an inbound transaction message, and an outbound transaction message for the transaction, respectively. When computer system communicates as a source, the data processor or integration engine stores incoming source transaction messages in the inbound archive file. When a destination computer system communicates as a receiver, the message exchange system stores a destination transaction message, either an unchanged version or a modified version of the stored source transaction message in the outbound archive file.

When an inbound transaction is accessed and modified, the system copies the original transaction as a modified transaction, identifies the new or modified transaction with transaction key or identifier. A copy of the new transaction is stored, and a linkage to the new transaction is provided in the archive file for the original transaction modified. The linkage information stored with the original transaction contains a linkage indicator of type inbound to inbound. A similar process is implemented when a transaction is accessed and resent. The system provides users with an ability to view a transaction message related to a transaction message that was modified, for example, an original inbound transaction for the modified transaction. The system further provides users with the ability to view any resends of transaction messages previously sent, and/or resent. For example, where an inbound transaction message is resent, a user may select to view all linkage information for the inbound transaction. All transaction records stored in association with a linkage indicator of inbound to inbound transactions indicate that the transaction message is modified or resent. The system presents a display image including a field or button to link the resend transaction to the original inbound to inbound transactions, and connections to which the source transaction was directed (inbound to outbound link).

The system links an inbound transaction by associating linkage information to the transaction that includes the identifier key and the outbound connection name, or identity of the computer system to which the associated outbound transaction is sent. Where a new transaction in the inbound archive is recreated upon resend, as mentioned, the systems creates a new inbound transaction and stores it in the store associated with the connection, and links the stored transaction to the destination transaction keys for each destination connection. The inbound and outbound connection links remain unmodified for the new or created transaction, but the existing inbound archive entry is updated with the identifier and linkage information (linkage record) for the new transaction. The system provides linking from an outbound transaction identifier to the inbound transaction identifier of the source transaction.

As mentioned, the system, upon selection by a user of either an inbound or outbound transaction message from the archive displays the inbound or outbound transactions and also display an option to display the associated linked transactions. The user selects the linked transactions option to see the linked transactions and associated linked transactions, e.g., inbound links to other inbound transactions, inbound links to associated outbound transactions and outbound links to associated inbound transactions. The list of linked transactions includes any transaction linked to an original or source transaction even if the linkage is across multiple connections. For example, a user viewing an interface to a computer system ABC that comprises a connection ONE and connection TWO can select a transaction with connection ONE. Connections ONE and TWO are object definitions that the integration engine associate to different computer systems or executable applications. If that transaction is linked to a transaction in a connection THREE (from another interface XYZ), the transaction for connection THREE is included and presented as part of a linked transaction list.

In the event that a linked transaction is no longer available in the corresponding archive, the status of the linked transaction and the transmitted date/time is not displayed in the linked transaction list. If a user selects a linked transaction that no longer exists, e.g., where the transaction is removed by routine maintenance, or if archiving operation is not activated for the linked transaction, a message displays indicating that the linked transaction is not available because it is deleted or because archiving is not enabled for that connection.

An executable application as used herein comprises code or machine readable instruction for implementing predetermined functions including those of an operating system, healthcare information system or other information processing system, for example, in response to user command or input. An executable procedure is a segment of code (machine readable instruction), sub-routine, or other distinct section of code or portion of an executable application for performing one or more particular processes and may include performing operations on received input parameters (or in response to received input parameters) and providing resulting output parameters. A processor as used herein is a device and/or set of machine-readable instructions for performing tasks. As used herein, a processor comprises any one or combination of, hardware, firmware, and/or software. A processor acts upon information by manipulating, analyzing, modifying, convening or transmitting information for use by an executable procedure or an information device, and/or by routing the information to an output device. A processor may use or comprise the capabilities of a controller or microprocessor, for example. A display processor or generator is a known element comprising electronic circuitry or software or a combination of both for generating display images or portions thereof. A user interface comprises one or more display images enabling user interaction with a processor or other device.

One embodiment of a system (100) for exchanging transaction messages between different computer systems is shown in FIG. 1. System (100) includes a data processor (110) for monitoring transaction messages exchanged between the different computer systems (i.e., computer systems). The different computer systems may comprise a healthcare system or linked network of healthcare-related computer systems. The transaction message exchange system (100) carries out transaction inter-messaging. Data processor (110) comprises a transaction processor (120) for assigning, an identifier for inbound transaction messages from source executable applications and outbound transaction messages for communication to destination executable applications, to individually identify the inbound and outbound transaction messages. Transaction processor (120) also provides communication among the executable application connections.

Data processor (110) further comprises a repository of map information (130) associating inbound and outbound transactions using the assigned identifiers, and a user interface (140) for providing data representing at least one display image that presents data identifying an inbound or outbound transaction message and a corresponding outbound or inbound transaction message, in response to user command. The system may include, and may connect to a store (150) for storing copies of inbound transaction messages from a source executable application (for communication to a destination executable application). Storing transactions enables re-sending a previous or original transaction by processing the stored transaction and re-sending as an outbound transaction to the destination connection, or destination computer system (or executable application). The transaction processor (120) assigns a transaction identifier to a resend transaction message associating the resend transaction message to the original inbound transaction message, and stores it in the repository of map information (130). At least one display image includes data identifying the original transaction, and allows a viewer to link to and view transaction data associated with the original transaction by the identifier of the original transaction by simple user command.

Figure 2:
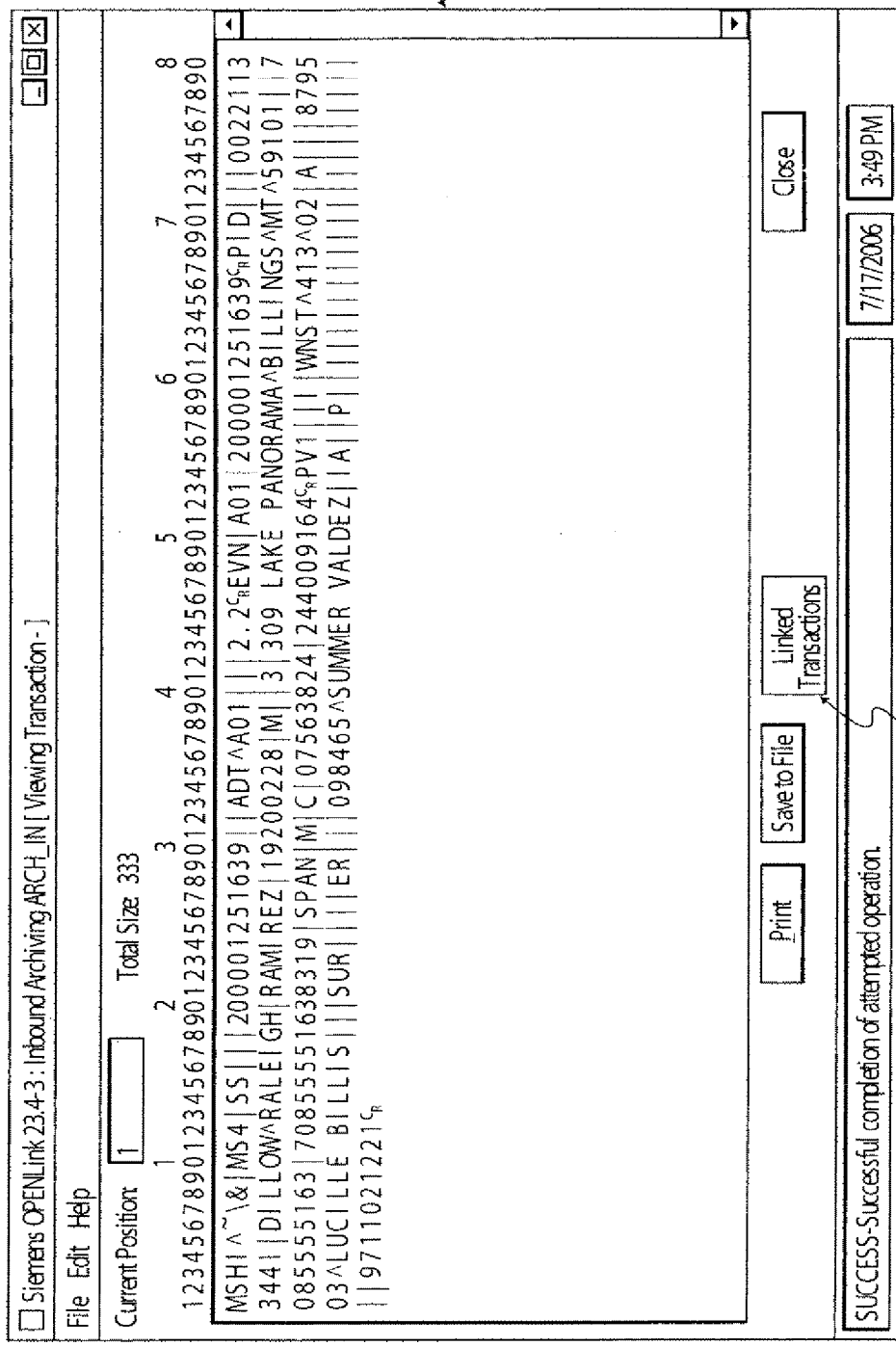
FIG. 2 is an exemplary display image of an original transaction including a link to related transactions.

FIG. 2 is a display image (200) presenting information comprising a transaction message. A "linked transactions" display field or button (210) is activated by a user to view a display image of any transactions linked to the transaction being viewed. The user interface generates a display image presenting data for the linked transactions, preferably as a list as shown in a display image (300) of FIG. 3. In the form presented, the display image (300) presents fields with data associated with each linked transaction presented. A field (310) identifies the transaction connection, a field (320) identifies transaction status, a field (330) identifies the type of linkage for the transaction, a field (340) identifies the time and date that the transaction is posted, field (350) identifies a transaction process time date and field (360) identifies a transaction key for the transaction. An execute field or button (370) executes the link to the transaction selected, and a field or button (380) provides for exiting the function and display image.

Figure 3:
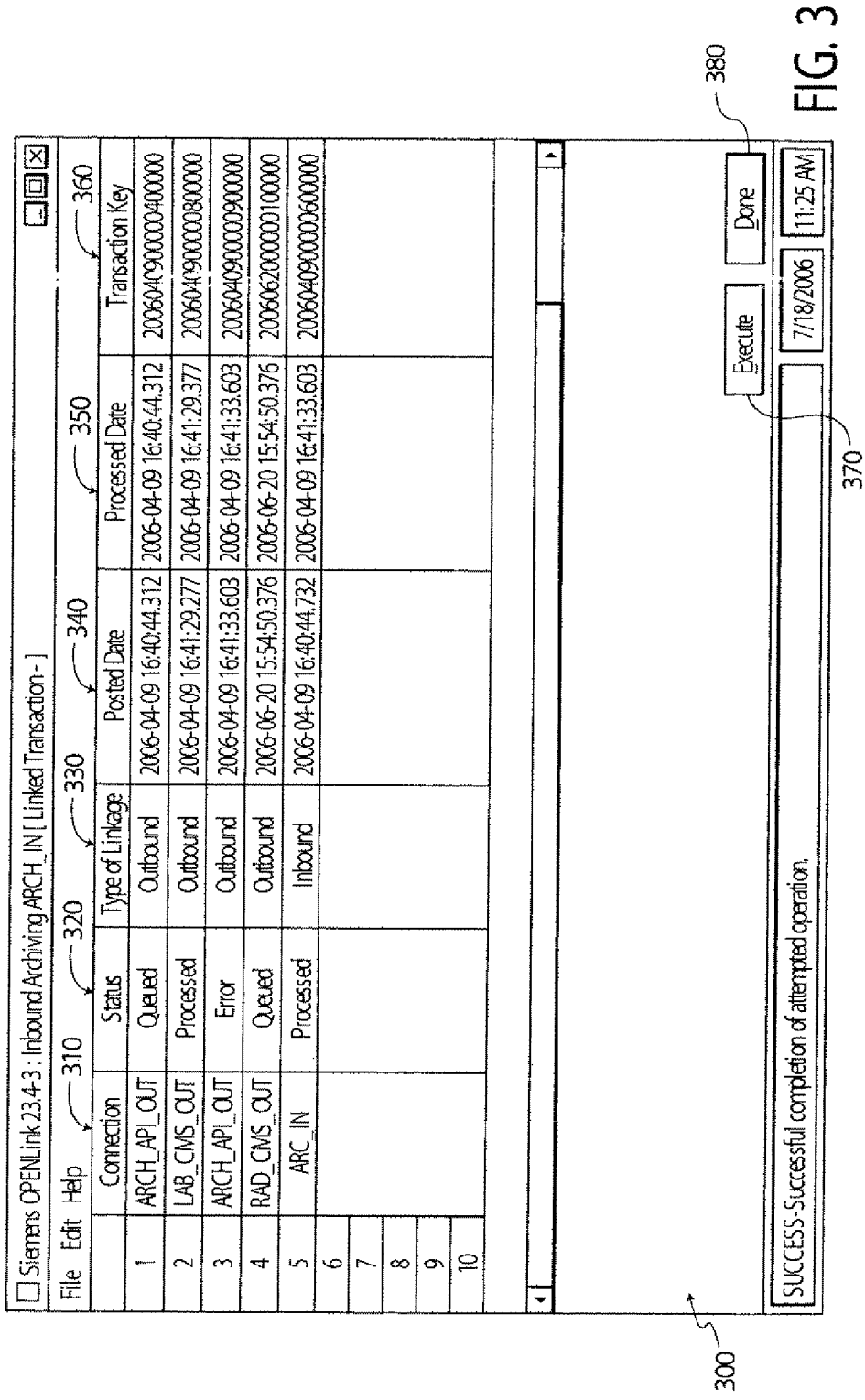
FIG. 3 is an exemplary display image displaying a linked transaction list.

From the linked transaction list of FIG. 3, the user can select a linked transaction by clicking on the transaction. If the selected linked transaction is available, the system returns a display image with the linked transaction information, such as the display image of FIG. 2. The user, by accessing the transaction information can resend the transaction, and trace the resent transaction other connections to confirm whether it is received (completed). If there is no confirmation data, or issues of missing or invalid data are not resolved by the display image, then the problem needs to be researched back to the original connection. Where the user wishes to view, access and modify a prior transaction message, the system links to the original inbound transaction and presents the transaction record or archive file stored before any correction or modification was made to the transaction message for communication to the destination connection (executable application). The system links to the source transaction inbound archive file, associated with the transaction identifier, using inbound archive and archive search functions, and may modify and resend the original transaction, which is linked to the original transaction by a transaction key, or identifier for the resend transaction.

Inbound

1. Inbound to Outbound

During messaging workflow, a source computer system issues a transaction message to a destination computer system associated as an inbound connection. The inbound connection is a preconfigured link to the computer system for communicating transactions with appropriate protocol to the data processor (110), or integration engine. The data processor (110) receives and processes the inbound to outbound transaction message from the preconfigured inbound connection (identification of source computer system), and determines that data naming or identifying a destination connection (a destination computer system or executable application) necessary to complete the transaction message.

A connection as used in this context represents an object definition within the integration engine that is either responsible for inbound connectivity into the integrations engine from the source system or the outbound connectivity into the destinations system. A connection within this respect owns the responsibility for either sending or receiving data along with maintaining the archived transaction messages of that relationship.

Where the transaction message is to multiple destination computer systems or executable applications, or outbound connections, the connections receive the send request (for the transaction message), and responds by returning the linkage information (i.e., the connections respond by sending back the linkage information). The outbound connection (the name of the destination computer system or executable application) sends a response message including data identifying a communication link used to send a transaction message to a destination (outbound connection linkage information) to be logged to the associated stored archive file for the transaction message if the system configuration for that connection in the integration engine has outbound archiving enabled, and the transaction was successfully stored in an outbound transaction store.

When the response to the request is received at the source connection (configuration for source computer system), the data processor or integration engine stores the outbound connection linkage information and the source transaction data in an inbound archive file in the store (150) for that source connection. As each response is received by the transaction processor (120), the linkage information is updated in the inbound archive file for the source connection. The archived inbound transaction includes linkage information (linkage record) that identifies the transaction as an "Inbound to Outbound" linkage record. Where an inbound transaction message is outbound to multiple destinations, the stored inbound transaction file includes linkage information for linking the inbound transaction file to the outbound connections.

2. Inbound to Inbound

For an inbound to inbound transaction, an inbound archive file transaction record is resent, or edited and resent by system (100). A resend operation of a linked transaction stored in the inbound archive file is processed similarly by the system. A copy of the original transaction message is created and stored in the inbound archive file as the "resent" transaction. The system assigns a linkage to the resend transaction and processes the resend transaction as an original transaction message, storing the resend transaction in the inbound archive file for the original source connection in association with a linkage identifier linking it to the original transaction mess age. The linkage information for the resend transaction message is appended to or linked with the linkage information from the original transmission. The stored linkage record includes the linkage indicator identifying the transaction as "Inbound to Inbound."

Figure 4:
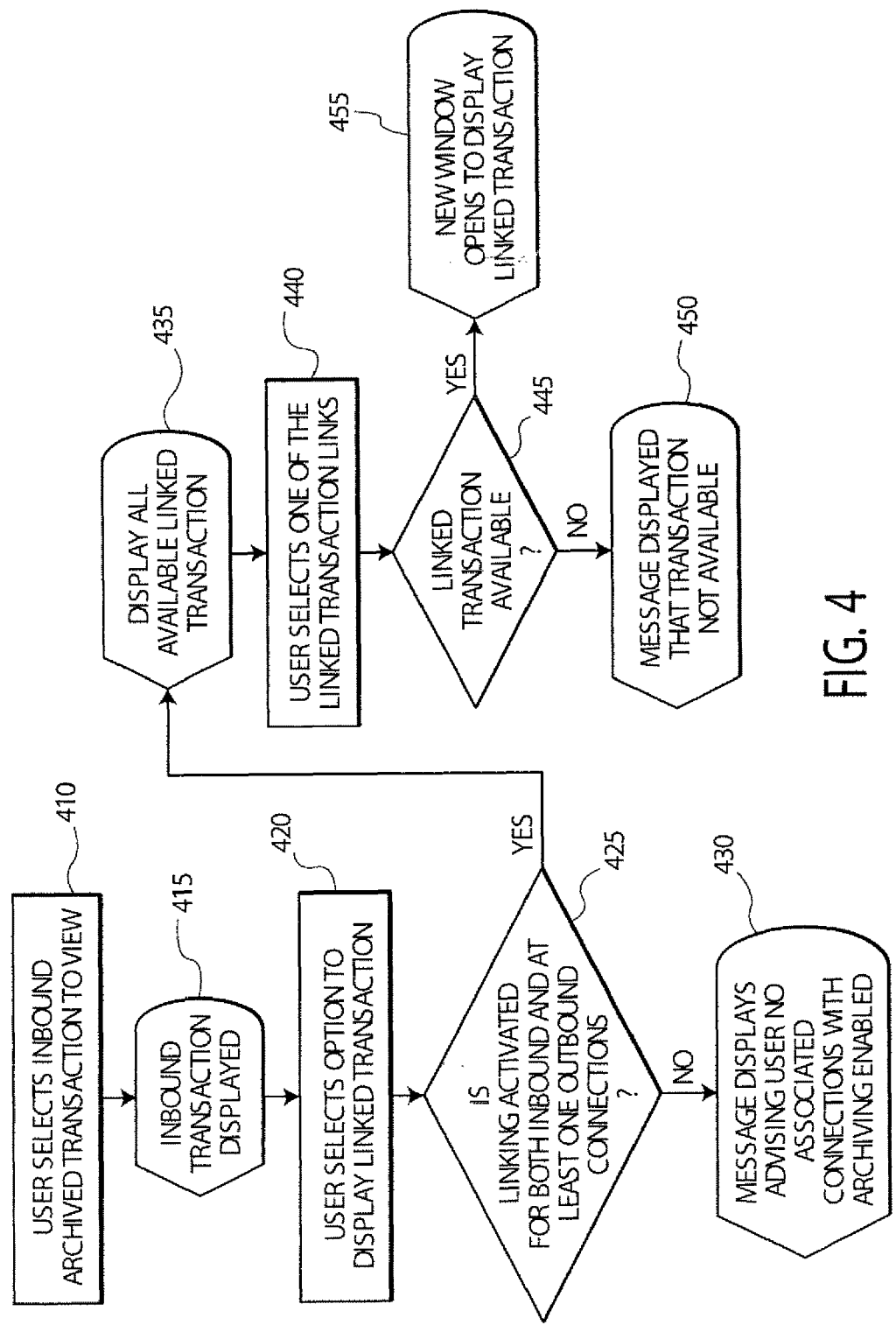
FIG. 4 is a system process flow diagram highlighting inbound to inbound and inbound to outbound linkage operation.

One embodiment of inbound to outbound, and inbound to inbound transaction message exchange process flow is described in detail with reference to FIG. 4. Process operator (410) represents user interface (140, FIG. 1) operation by which a user selects a stored inbound transaction in a display image comprising a linked transaction list such as display image (300) shown in FIG. 3. A display operator (415) represents operation by which the selected inbound transaction is displayed. The display image presenting the selected inbound transaction includes linkage information (linkage record) and transaction key, as well as the other transaction information described with reference to FIG. 3. Process operator (420) represents an operation by which a user selects or activates linkage information (linkage record) field in the display image to link to a linked transaction. Decision diamond (425) represents an operation performed in response to user selection to display the linked transaction. If there is no linked transaction (No), process flow presents a message advising the user, as indicated by display operator (430). If there is activated linking for the initial inbound transaction and a linked transaction, linked transactions are displayed. The display of available linked transactions, for example, as a list, is indicated by display operator (435).

Linked transactions may include all outbound transactions, and resent inbound transactions, in any status. That is, the user interface (140, FIG. 1) provides a display image (435) with linked transaction information that includes a transaction key (360, FIG. 3) for each transaction displayed, a transaction creation time date, or posted time date (340, FIG. 3), a transmission time date (350, FIG. 3) identifying when the transaction is processed, a connection identifier (310, FIG. 3) for the transaction, a status identifier (320, FIG. 3) and identifier defining the type of linkage (FIG. 3, 330), e.g., inbound, outbound, as described above with reference to FIG. 3. The user clicks on one transaction (field) in the linked transaction list, as indicated by process operator (440). The system responds by determining if the linked transaction is available, as represented by decision diamond (445). The selected linked transaction may not be accessible, or existing. If the selected transaction is not available, a message communicating this is presented as shown by display operator (450). If the linked transaction is available, a new display image is presented to display the linked transaction and associated transaction data as indicated by display operator (455).

Outbound

Outbound to Inbound

For outbound to inbound transactions, the system implements one or more processes. A first process executes in a case where a transaction record is immediately stored as an inbound transaction in an inbound transaction archive file. When an inbound transaction is sent from a source connection to a destination connection, the source connection supplies linkage information with the transaction message request for the destination connection. An outbound to inbound transaction identifier, and outbound transaction file are created. Both the linkage information and the source transaction can be stored together in the outbound transaction archive file. The linkage indicator identifies the transaction as an "Outbound to Inbound" linkage or transaction record. A resend operation of a transaction stored in an outbound archive file follows the same processing as explained above with respect to inbound transaction archive operation. The linkage indicator for the resend is appended to the linkage information from the original (outbound) transmission.

The following describes system operation by which the transaction waits to see that the transaction is queued. When an outbound connection receives data from an inbound connection, the outbound connection stores the transaction in the outbound archive file for the destination connection. The outbound connection sends back a response to the inbound connection along with enough information enabling an inbound connection to know where to locate the transaction record that was just stored in the outbound archive file. Outbound connections using outbound archive files send information back.

When the inbound connection gets the response back from the outbound connection, including that the transaction is queued to the outbound connection, the inbound connection stores the response in the inbound archive file for the source connection. The inbound connection now has information concerning the inbound transaction that is stored in each outbound connection to which the outbound transaction message is communicated. The inbound connection uses the returned information to access the archived transaction, and access the outbound archive file for each destination connection and updates the linkage information. The linkage record that is stored has an indicator that marks this is an "Outbound to Inbound" linkage record. The linkage information is stored with the transaction and becomes part of the record of the transaction.

Figure 5:
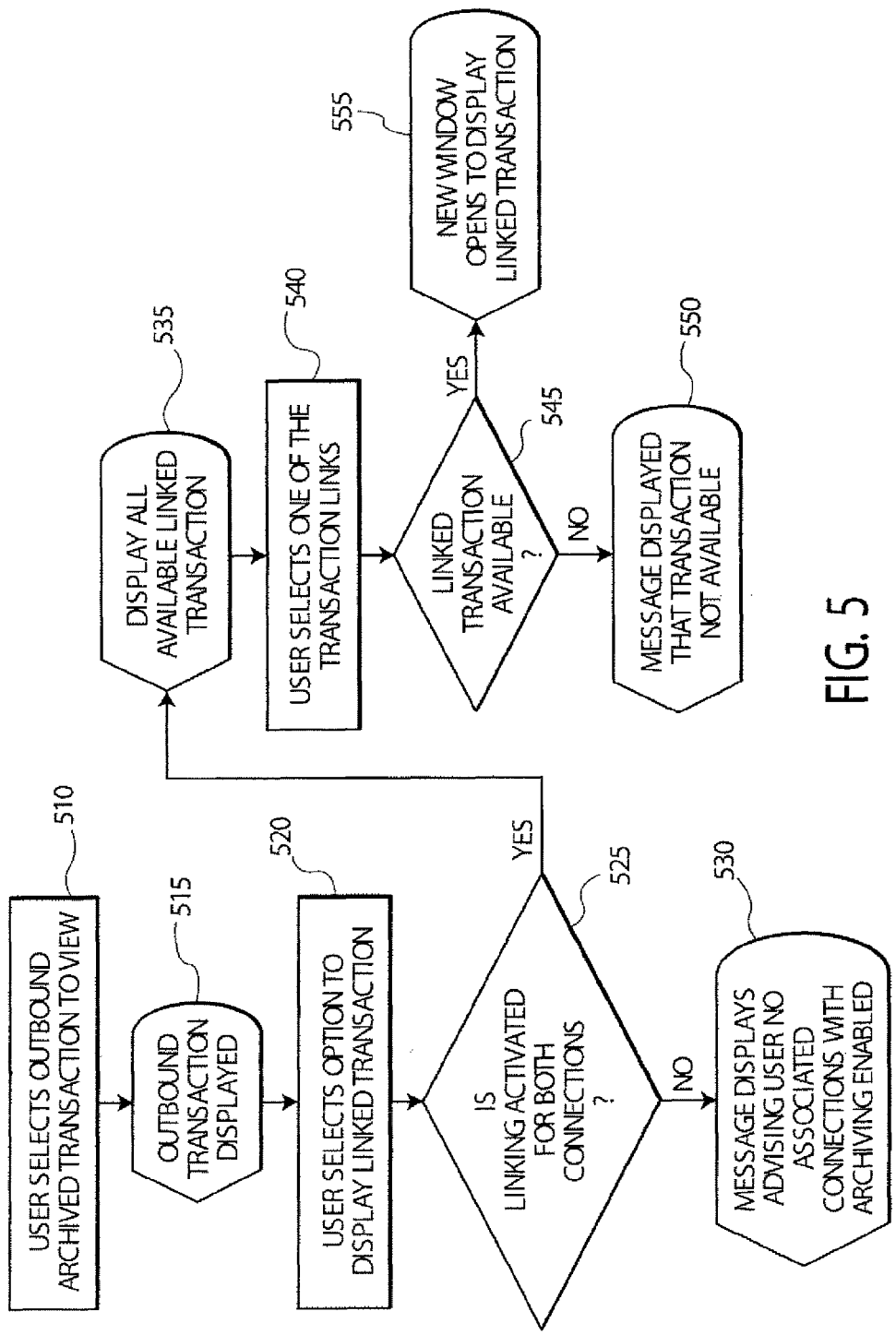
FIG. 5 is a system process flow diagram highlighting outbound to inbound linkage operation.

One embodiment of outbound to inbound transaction message exchange process flow is described in detail with reference to FIG. 5. Process operator (510) represents user interface (140, FIG. 1) operation by which a user selects a stored outbound transaction in a display image comprising a linked transaction list, such as depicted by display image (300) of FIG. 3. A display operator (515) represents operation by which the selected outbound transaction is displayed. The display image presenting the selected outbound transaction includes linkage information (linkage record) and transaction key, as well as links to the other transaction information described with reference to FIG. 3. Process operator (520) represents an operation by which a user selects or activates linkage information (linkage record) field in the display image to link to a linked transaction. Decision diamond (525) represents operation in response to user selection to display the linked transaction. If there is no linking activated for both connections for a linked transaction (No), process flow presents a message advising the user that there are no associated connections enabled, as indicated by display operator (530). If there is activated linking for both connections, linked transactions are displayed. The display of available linked transactions, for example, as a list, is indicated by display operator (535).

Linked transactions may include inbound transactions, and resent outbound transactions, in any status. The transaction information displayed includes linkage information (linkage record) key, or transaction key (360, FIG. 3) for each transaction displayed, a transaction creation time date (340, FIG. 3), a transmission time date for the transaction (350, FIG. 3), a connection identifier (310, FIG. 3) for the transaction, a status (320, FIG. 3) and information defining the type of linkage (330, FIG. 3), as described above. The user clicks on one transaction (field) in the linked transaction list, as indicated by process operator (540). The system responds by determining if the linked transaction is available, as represented by decision diamond (545). The selected linked transaction may not be accessible, or existing. If the selected transaction is not available, a message communicating that the selected transaction is "not available" is presented as shown by display operator (550). If the linked transaction is available, a new display image is presented to display the linked transaction and associated transaction data as indicated by display operator (555).

Although a few examples of the present invention are shown and described, it would be appreciated by those skilled in the art that changes may be made in these embodiments without departing from the principles and spirit of the invention, the scope of which is defined in the claims and their equivalents.

What is claimed is:

1. In a system for exchanging transaction messages between different computer systems, a data processor for processing transaction messages, comprising:
 a transaction processor for automatically sending to a plurality of destinations individual transaction messages corresponding to individual transaction messages received from a plurality of different sources and for assigning individual identifiers to an inbound transaction message from a source executable application and a corresponding outbound transaction message for communication to a destination executable application and to a resent transaction message corresponding to said outbound transaction message to individually identify transaction messages, said resent transaction message comprising a copy of said outbound transaction message previously sent in response to a determination said outbound transaction message was not correctly received by said destination executable application;
 a repository of map information comprising a linkage record associating the inbound, outbound and resent transaction messages using said assigned identifiers; and
 a user interface for providing data representing at least one display image and including data identifying the inbound transaction message and the corresponding outbound and resent transaction message, in response to user a command.

2. A system according to claim 1, wherein said resent transaction message comprises an unmodified copy of said outbound transaction message and including
 a store including copies of inbound transaction messages communicated to destination executable applications and enabling re-sending of a copy of a particular transaction message previously sent to a destination executable application in response to a determination that said particular transaction message was not correctly received by said destination executable application wherein
 said system exchanges transaction messages between different computer systems.

3. A system according to claim 2, wherein
 said transaction processor assigns identifiers to said particular transaction message and said re-sent copy of said particular transaction message,
 said map information associates said particular transaction message and said re-sent copy of said particular transaction message using assigned identifiers.

4. A system according to claim 3, wherein said at least one display image includes data identifying said particular transaction message and said re-sent copy of said particular transaction message, in response to the user command.

5. A system according to claim 3, wherein said at least one display image identifies transactions by linkage information (linkage record) as an outbound and an inbound transaction.

6. A system according to claim 3, said at least one display image identifies a connection for a computer system or executable application associated with a linked transaction.

7. A system according to claim 3, said at least one display image identifies a transaction key for a linked transaction to a connection.

8. A system according to claim 3, said at least one display image identifies a creation time date for a linked transaction.

9. A system according to claim 3, said at least one display image identifies a processed time date for a linked transaction.

10. A system according to claim 3, said at least one display image identifies a status for a linked transaction.

11. A system for exchanging transaction messages between different computer systems, a data processor for processing transaction messages, comprising: in a system for exchanging transaction messages between different computer systems,
 a transaction processor for automatically sending to a plurality of destinations individual transaction messages corresponding to individual transaction messages received from a plurality of different sources and for assigning individual identifiers to an inbound transaction message from a source executable application and a corresponding outbound transaction message for communication to a destination executable application and to a resent transaction message corresponding to said outbound transaction message to individually identify transaction messages, said resent transaction message comprising a copy of said outbound transaction message previously sent in response to a determination said outbound transaction message was not correctly received by said destination executable application;
 a store for storing copies of inbound transaction messages communicated to destination executable applications and enabling re-sending of a copy of a particular transaction message previously sent to a destination executable application in response to a determination that said particular transaction message was not correctly received by said destination executable application, including map information associating the inbound and outbound transaction messages using said assigned identifiers; and
 a user interface for providing data representing at least one display image and including data identifying the outbound transaction message and a corresponding inbound and resent transaction message, in response to a user command.

12. A system for integrating transaction message exchange between computer systems interoperating to support healthcare workflow, including monitoring exchanges using a transaction message exchange integration engine, the integration engine comprising:
 a transaction processor for automatically sending to a plurality of destinations individual transaction messages corresponding to individual transaction messages received from a plurality of different sources;
 a repository of map information comprising a linkage record that associates individual inbound, outbound and resent transaction message individual identifiers assigned to connections, which are representative of source and destination computer systems that exchange transaction messages using the integration engine, a resent transaction message comprising a copy of an outbound transaction message previously sent in response to a determination said outbound transaction message was not correctly received by a destination computer system;
 a store stores and maintains transaction message data, associated with a connection, for the transaction messages exchanged by the integration engine and the computer systems; and
 a user interface provides data representing at least one display image and including data identifying an inbound or outbound transaction message, and a corresponding outbound or inbound and resent transaction message determined from the linkage record, in response to a user command.

13. The system according to claim 12, wherein said resent transaction message comprises an unmodified copy of said outbound transaction message and the store includes copies of inbound transaction messages communicated by connection to destination executable applications and enabling modification and resend, and resend of a copy of a particular transaction message previously sent to an executable application, and stored, after determining that the previously sent transaction message was not correctly received, or not received by the destination executable application.

14. The system according to claim 13, wherein the integration engine, for a transaction message modification and resend, or resend, copies the original stored transaction, and processes to modify the copy, or resend the copy as a new modified or resent transaction message using the same connections for the original transaction message.

* * * * *